US008733140B2

(12) United States Patent  (10) Patent No.: US 8,733,140 B2
Jones  (45) Date of Patent: May 27, 2014

(54) TRAILER THEFT DETERRENT DEVICE

(76) Inventor: Charles Jones, Tulsa, OK (US)

(*) Notice: Subject to any disclaimer, the term of this patent is extended or adjusted under 35 U.S.C. 154(b) by 0 days.

(21) Appl. No.: 13/208,427

(22) Filed: Aug. 12, 2011

(65) Prior Publication Data

US 2012/0260702 A1  Oct. 18, 2012

Related U.S. Application Data

(60) Provisional application No. 61/475,049, filed on Apr. 13, 2011.

(51) Int. Cl.
B60R 25/00 (2013.01)

(52) U.S. Cl.
USPC .......... 70/225; 70/226; 70/232; 70/DIG. 57; 188/32

(58) Field of Classification Search
USPC .......... 70/225, 226, 234, 235, 259, 260, 232, 70/DIG. 57, 227, 228, 229–231, 237; 188/32, 5–8; 411/910; 280/297; 248/551
See application file for complete search history.

(56) References Cited

U.S. PATENT DOCUMENTS

| 604,050 | A | * | 5/1898 | Jones | 280/297 |
| 877,031 | A | * | 1/1908 | Ackerman | 188/6 |
| 1,381,983 | A | * | 6/1921 | Fox | 40/587 |
| 1,430,837 | A | * | 10/1922 | Oakes | 70/259 |
| 1,447,564 | A | * | 3/1923 | Norlund et al. | 411/337 |
| 1,768,293 | A | * | 6/1930 | Reed | 70/231 |
| 1,912,872 | A | * | 6/1933 | Trautner et al. | 70/260 |
| 2,160,502 | A | * | 5/1939 | Heffner et al. | 188/8 |
| 2,344,038 | A | * | 3/1944 | Griffiths | 70/259 |
| 2,630,961 | A | * | 3/1953 | Burg | 182/15 |
| 3,625,313 | A | * | 12/1971 | Lowrie | 188/4 R |
| 3,726,366 | A | * | 4/1973 | Williams | 188/6 |
| 3,822,850 | A | * | 7/1974 | Elias | 248/551 |
| 4,639,045 | A | | 1/1987 | Kane | |
| 4,825,669 | A | | 5/1989 | Herrera | |
| 4,856,305 | A | * | 8/1989 | Adams | 70/58 |
| 5,067,746 | A | * | 11/1991 | Baker | 280/763.1 |
| 5,214,945 | A | * | 6/1993 | Martin | 70/232 |
| 5,301,527 | A | | 4/1994 | Pollard | |
| 5,410,897 | A | | 5/1995 | Edmondson | |
| 5,520,034 | A | | 5/1996 | Edmondson | |
| 5,599,002 | A | * | 2/1997 | Knutson | 248/552 |
| 5,706,682 | A | * | 1/1998 | Barker et al. | 70/226 |

(Continued)

FOREIGN PATENT DOCUMENTS

| GB | 2091182 A | * | 7/1982 |
| GB | 2185454 | * | 7/1987 |
| GB | 2270289 A | * | 3/1994 |

Primary Examiner — Lloyd Gall
(74) Attorney, Agent, or Firm — Daniel Boudwin; Global Intellectual Property Agency LLC

(57) ABSTRACT

Disclosed is a security device to prevent trailer theft that attaches to the lug thread of a wheel hub to prevent wheel rotation or wheel mounting. The device includes an outer cylinder, an inner cylinder, a locking lug nut that screws onto the lug thread, and a lug nut key. The outer and inner cylinders rotate around and extend beyond the locking lug nut, utilizing a design that defeats many common methods for removing wheel locks, or requires specific tools that create considerable noise and time to defeat. An optional security bar can be engaged by removing two lug nuts to prevent wheel rotation. Also disclosed is an embodiment that prevents wheel installation on a bare wheel hub.

3 Claims, 2 Drawing Sheets

(56) References Cited

U.S. PATENT DOCUMENTS

| | | | |
|---|---|---|---|
| 5,832,759 A * | 11/1998 | Yamabe | 70/226 |
| 5,860,492 A * | 1/1999 | Talaska | 188/5 |
| 6,058,749 A * | 5/2000 | Rekemeyer | 70/226 |
| 6,073,470 A * | 6/2000 | Burnitzki et al. | 70/226 |
| 6,305,890 B1 * | 10/2001 | Okamura | 411/431 |
| 6,419,326 B1 | 7/2002 | Rains | |
| 6,450,472 B1 * | 9/2002 | Cook, Jr. | 248/551 |
| 6,494,658 B1 * | 12/2002 | Roy | 411/428 |
| 6,571,588 B1 * | 6/2003 | Yuen | 70/233 |
| 6,834,454 B2 * | 12/2004 | Klein | 42/70.11 |
| 6,908,273 B2 * | 6/2005 | Mackay | 411/432 |
| 8,499,899 B2 * | 8/2013 | Scott | 188/32 |
| 2003/0019260 A1 * | 1/2003 | Smith | 70/235 |
| 2003/0140664 A1 * | 7/2003 | Swertz | 70/225 |
| 2009/0090146 A1 * | 4/2009 | Bosman | 70/225 |

* cited by examiner

TRAILER THEFT DETERRENT DEVICE

CROSS REFERENCE TO RELATED APPLICATION

This application claims the benefit of U.S. Provisional Application No. 61/475,049 filed on Apr. 13, 2011, entitled "Trailer Theft Deterrent."

BACKGROUND OF THE INVENTION

1. Field of the Invention

The present invention relates generally to the field of security devices that are attachable to trailer wheel hubs to prevent trailers from being stolen or moved. More specifically, the present invention pertains to a unique device that attaches to the lug thread of a wheel hub to prevent wheel rotation or wheel mounting.

A trailer is a type of unpowered vehicle that is pulled by a powered vehicle. Some typical examples are trailers used to transport goods, boats, horses, or mobile homes. Trailers generally have two to four wheels, and attach to another vehicle by a tongue hitch. A problem inherent to the design of trailers is a lack of security means that locks them in a static position when left unattended. Trailers typically do not come with doors, or a braking system that would allow them to be securely parked. Moving a trailer simply requires connecting a powered vehicle to the tongue hitch and driving the trailer away. This lack of security poses a threat to trailer owners, as unattended trailers are common targets of theft.

The present invention improves upon trailer theft prevention designs by rendering a trailer wheel immobile, while also preventing the installation of a replacement wheel and tire for trailers on a bare hub. The present invention is ideal for use on a mobile trailer, such as a utility trailer, boat trailer, equipment or vehicle trailer, but it can also be used to secure any tire mounted on threaded studs, such as spare tires on an exterior holder or specialty wheels mounted on a standard automobile. The present invention utilizes a locking lug nut that requires a special key for engaging the lug nut, which is surrounded by two stainless steel cylinders that are free to rotate about the lug nut. This design defeats many common methods for removing wheel locks, including rotary and reciprocating cutting tools, along with specialty lug nut removal tools that can engage and defeat a common lock nut. The present invention provides a means to delay a would-be thief by presenting a lug locking design that is considerably more complex to defeat, and causes considerable noise and time to do so.

2. Description of the Prior Art

Several devices have been disclosed in the art that attempt to prevent trailer theft. These devices have familiar design elements that focus on attaching a mechanism to a wheel to prevent the wheel from being removed.

Kane, U.S. Pat. No. 4,639,045 discloses a protection apparatus for lug nuts on a truck wheel. Clips are retained to the wheel by the lug nuts, and a flange extends outwardly away from the base. Attached to the flange is a skirt that protects the lug nuts and bolts. Herrera, U.S. Pat. No. 4,825,669 discloses a locking assembly for fastening a lug nut cover on a vehicle wheel. The mounting bracket and the lug nut cover both have elongated holes that are universal and allow them to fit a large number of lug bolt positions and pitches, as measured from the center of the axle to the center of the lug bolt. A lug nut cover is fitted onto special lug nuts. Stormer, U.S. Pat. No. 6,419,326 discloses a locking lug cover assembly which utilizes an annulus secured by a locking mechanism to specially designed lug nuts or studs of a vehicle wheel for prohibiting access to its lug nuts or studs. A locking mechanism extends through the cross section of the annulus to communicate with the lug nuts or bolts and hold the lug cover securely in place. These devices are designed to protect against wheel removal; however they do not prevent wheel rotation, and therefore afford little protection against trailer theft. They similarly do not describe the elements of the locking mechanism, wherein two concentric and freely-rotating cylinders are provided to thwart cutting tools. As a cutting tool engages the cylinders that surround the specialty lug key, they are free to rotate and are difficult to stabilize with secondary tools.

Several designs disclose a device that prevents wheel rotation. Edmondson, U.S. Pat. No. 5,520,034 discloses a wheel-locking device with a nut shield, a wheel bolt orifice on an attachment plate, and an end of nut shield. In the locking position, the lock rod is locked onto a wheel clamp that hooks over a wheel. Pollard, U.S. Pat. No. 5,301,527 discloses a security device for a trailer wheel that includes elongated wheel lug adapters and a back plate which are mounted with conventional lug nuts to the trailer wheel. Edmondson, U.S. Pat. No. 5,410,897 discloses a wheel-block lock with a chock on a chock end of a lock rod that is lockable in a lock sleeve. The lock sleeve is attached to a lug-cover shaft with a lug cover that is lockable onto a locking foot that is attached to a wheel with a lug nut. These devices are adapted to prevent wheel rotation; however they are easily overcome with bolt cutters, portable torches, and other cut off tools. The materials utilized in the present invention, along with its dual cylinder design, prevent the use of cutting torches to cut therethrough, and likewise prevent a thief from grasping a cylinder and applying a cutting tool thereto.

Along with generic cutting tools, thieves also have access to patented lock removal tools that will quickly defeat many standard types of trailer theft devices. These devices are adapted to be hammered or forcefully engaged over the end of a specialty locking bolt, security thereto. Reverse threading allows the engaged device to unscrew the locking nut without the specialty bit. Because of this, a lock that completely immobilizes a wheel lug nut is needed, and one that surrounds the lock nut with a shroud that defeats many common methods of nut removal. The present invention differs from the prior art in that it utilizes a design that defeats several methods for removing wheel locks, or requires specific tools that create considerable noise and time to defeat.

In addition to a specialty lock that shrouds a lug nut, the present invention is mountable to a bare hub to prevent wheel installation or alternatively to an existing wheel to prevent rotation thereof. This modularity is not known in the art. Many trailer owners will remove the wheels from their trailer as an added means of security for long term storage. To defeat such practices, thieves have been known to carry spare wheels to install on bare hubs. The present invention utilizes a unique design that prevents wheel mounting on a bare wheel hub. By protecting the bare hub of a trailer to prevent wheel installation, there trailer is effectively immobilized. During shorter periods of inactivity, or in situations wherein it is not feasible to remove a wheel from the trailer hub, a wheel securing means is provided to work in conjunction with the same lug nut immobilizing means provided for the wheel hub lock. The design of the present invention substantially diverges in elements from the prior art and consequently it is clear that there is a need in the art for an improvement to existing trailer theft devices. In this regard the instant invention substantially fulfills this need.

SUMMARY OF THE INVENTION

In view of the foregoing disadvantages inherent in the known types of trailer theft deterrents now present in the prior art, the present invention provides a new means of immobilizing a trailer that defeats many common methods for removing wheel locks, and also provides a new means for mounting a theft deterrent device to a bare hub or existing wheel to prevent trailer theft wherein the same can be utilized for providing convenience for the user when attempting to lock a trailer in place to prevent its unauthorized movement.

It is therefore an object of the present invention to provide a new and improved trailer theft deterrent device that has all of the advantages of the prior art and none of the disadvantages.

Another object of the present invention is to provide a new and improved lock that is mountable to a single lug thread, and one that can be utilized with a plurality of trailer immobilizing means.

Still another object of the present invention is to provide a new and improved trailer lock that comprises four parts, including an outer cylinder, an inner cylinder, a locking lug nut and a lug nut key. The cylinders of the device are concentrically mounted and freely rotate about the shank of the locking nut. The cylinders extend over the locking nut from the wheel hub to provide a shroud therefor. The dual cylinder design defeats cutting tools, while the shroud defeats reverse thread tools from engaging the lock nut from its terminal end.

Another object of the present invention is to provide a new and improved trailer lock wherefore the locking cylinder has an elongated shank and a specialty bit engagement at its terminal end.

A further object of the present invention is to provide a new and improved trailer lock that is attachable to a trailer immobilizing means, wherein the immobilizing means is a steel bar attached to the trailer wheel to prevent rotation thereof.

Still another object of the present invention is to provide a new and improved trailer lock that is attachable to a trailer immobilizing means, wherein the immobilizing means is an adjustable stand that supports a trailer hub after a tire is removed to prevent unauthorized mounting of a wheel to the bare hub.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
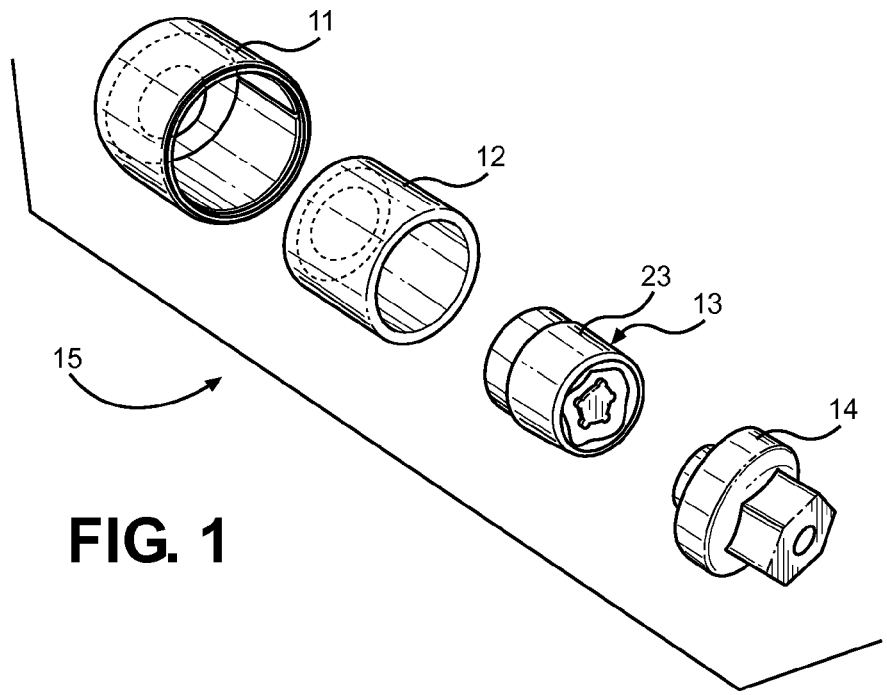
FIG. 1 shows a perspective view of the present invention, including the four main components of the locking assembly.

Referring now to FIG. 1, there is shown a perspective view of the preferred embodiment of the present invention, comprising an outer cylinder 11, an inner cylinder 12, a locking lug nut 13 that screws onto the lug thread, and a lock key 14. The outer cylinder 11 and inner cylinder 12 are open on end and partially closed on another end, allowing placement of the outer cylinder 11 and inner cylinder 12 over a lug thread against a wheel hub or wheel rim. The inner cylinder 12 fits inside the outer cylinder 11, and has an opening that is sized to fit the locking lug nut 13. The locking lug nut 13 comprises an interior threading to engage a vehicle lug bolt, along with an outside surface 23 that allows the inner 12 and outer 11 cylinder to rotate freely about the outside surface. The outer cylinder 11, the inner cylinder 12, the locking nut 13, and the locking key 14 comprise elements that form a locking assembly 15 that is adapted to securely engage a lug bolt of a vehicle.

The outer cylinder 11 and inner cylinder 12 are the key aspects of theft prevention device provided by the present disclosure. The locking lug nut 13 has an outside surface 23 on one end when installed to a wheel hub, allows the outer cylinder 11 and inner cylinder 12 to rotate freely about said locking lug nut. The ability of the outer cylinder 11 and inner cylinder 12 to rotate makes grasping the two extremely difficult with a tool, which prevents adequate engagement of a cutting tool onto the cylinder surface without inducing rotation of the cylinders. The rotation prevents the cutting tools from being utilized to their potential, as the motion of the tool creates rigid body rotation of the cylinders, as opposed to removing material therefrom to expose the outside surface of the locking nut 13. In addition, outer cylinder 11 and inner cylinder 12 are preferably made of stainless steel, which prevents removal with an acetylene cutting torch. Stainless steel contains high levels of chromium and nickel, which are stable at high temperatures and prevent the torch from burning through to the iron in the steel during operation. The outer cylinder 11 and inner cylinder 12 are also longer than the locking lug nut 13, which prevents the use of a reverse thread tools, which could otherwise remove the locking lug nut 13 using a reverse tapping method or outward engagement of the locking nut to bypass the specialty key. Combined, these design aspects afford a significantly higher amount of protection than the prior art, meaning the present invention will not be easily defeated by many of the common tools used to steal trailers, such as bolt cutters, power saws, cutting torches, and specialty lock removal tools.

The lug nut key 14 comprises a specific geometry that requires a conjugate key to engage with the locking lug nut 13 to apply a rotation thereto. Each locking lug nut 13 and lug nut key 14 has a unique design, which prevents removal of the locking lug nut 13 without the unique matching key. The locking lug nut 13 and lug nut key 14 are standard parts that are known in the art.

Figure 2:
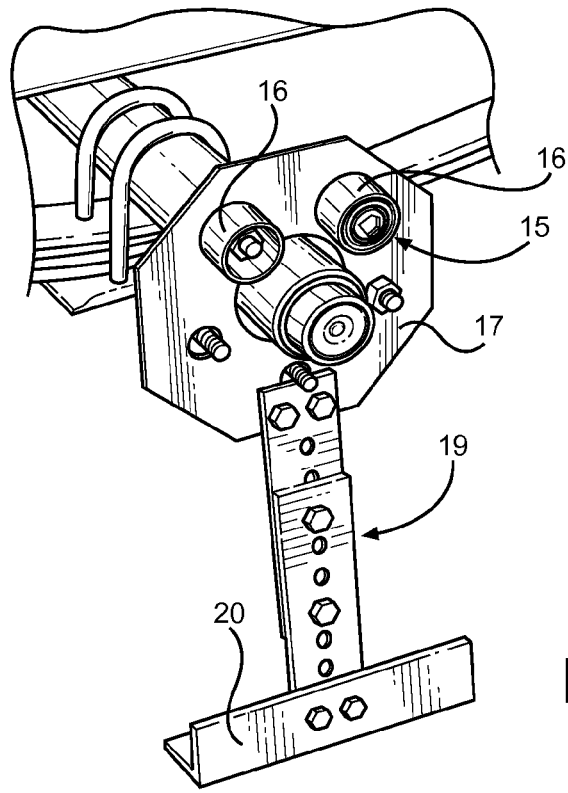
FIG. 2 shows a perspective view of the present invention, including the locking assembly being utilized with a vehicle immobilizing means embodiment, wherein a wheel hub stand assembly is supporting a bare wheel hub and preventing unauthorized mounting of a wheel thereto.

Referring now to FIG. 2, there is shown a perspective view of the locking assembly 15 being utilized with a vehicle immobilizing means embodiment, wherein a wheel hub stand assembly is supporting a bare wheel hub and preventing unauthorized mounting of a wheel thereto. The locking assembly 15 is installed on a wheel hub support plate 17. The wheel hub support plate 17 is placed over a bare wheel hub of the trailer, and is secured in place with the locking assembly 15. The hub support plate 17 prevents mounting of a wheel to the trailer wheel hub, and is supported above a ground surface by a support stand 19, 20.

The wheel hub support plate 17 contains a plurality of apertures that are spaced to align with the lug threads. The wheel hub support plate 17 engages with the wheel hub of the trailer and is firmly secured against the wheel hub by installation of a plurality of lug nuts and one or a plurality of locking assemblies 15. The plurality of apertures are large enough to allow the lug threads to pass through the wheel hub support plate 17, and are small enough to allow the lug nuts to bear against the plate when they are threadably attached.

A unique feature of the wheel hub support plate 17 is that it includes two upstanding cylinders 16 that are permanently affixed to and extend outward from the perimeter area of two of the apertures. This affords further protection to the locking assemblies 15 when installed within the cylinders 16. In this embodiment of the vehicle immobilizing means, up to two locking assemblies 15 may be utilized to afford a greater level of protection for a trailer wheel hub. The cylinder 16 prevents direct engagement of a grasping tool that would otherwise be utilized to prevent rotation of the outer cylinder 11 while attempting removal thereof with a cutting tool.

The wheel hub support plate 17 also includes a plurality of apertures to allow connection of a height adjustable mounting bracket 19 and ground support bracket 20, which are utilized to support the wheel hub and support plate in a suspended position when a wheel is not being utilized. The height adjustable mounting bracket 19 includes a plurality of apertures along its length, allowing its height to be adjusted based on the static height of the trailer it is attached to.

Figure 3:
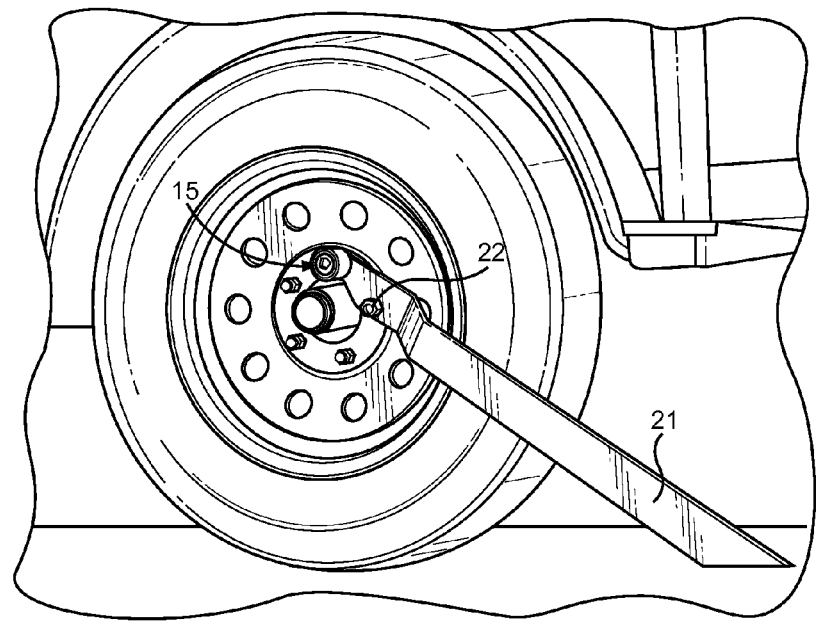
FIG. 3 shows a perspective view of the present invention, including the locking assembly being utilized with a vehicle immobilizing means embodiment wherein a security bar is installed on a trailer wheel to prevent rotation thereof.

Referring now to FIG. 3, there is shown a perspective view of the locking assembly 15 being utilized with a vehicle immobilizing means embodiment wherein a security bar 21 is installed on a trailer wheel to prevent rotation thereof. The security bar 21 attaches to the trailer wheel via two apertures that align with two threaded lugs thereon, allowing the security bar 21 to secure to the hub at two locations and make contact with the ground at its free end. Two lug nuts are removed from the trailer wheel, and the security bar 21 is placed over the open lug threads and pressed against the wheel. A lug nut 22 is threadably attached to one of the open lug threads, while the locking assembly 15 attaches to the second other open lug thread, which prevents the security bar 21 from being removed. If desired, two locking assemblies 15 may be utilized on the security bar 21 at one time, further increasing protection and the time required to defeat the present invention.

The length of the security bar 21 is greater than the radius of the trailer wheel. Thus, the trailer cannot be effectively moved because the trailer wheel cannot rotate except as permitted by rotation of the security bar 21. This embodiment is particularly useful in preventing unauthorized use of the trailer during short stops when the user does not have time or desire to remove a tire.

Figure 4:
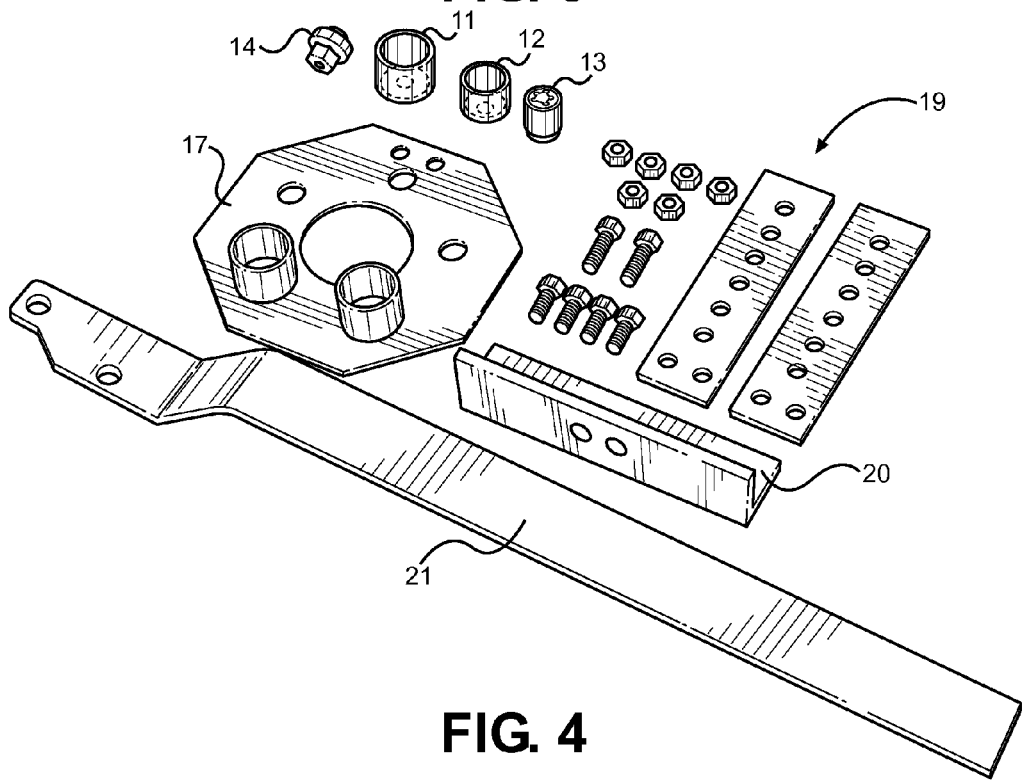
FIG. 4 shows a perspective view of the present invention, including the full kit assembly that comprises the locking assembly and both embodiments of the vehicle immobilizing means.

Referring now to FIG. 4, there is shown a perspective view of the present invention, including a full kit assembly that comprises the locking assembly and both embodiments of the vehicle immobilizing means. The device includes the outer cylinder 11, inner cylinder 12, locking lug nut 13 that screws onto the lug bolt, and lug nut key 14. Also shown are the embodiments of the vehicle immobilizing means, included the security bar 21 for use on a trailer wheel for short stops and the hub support plate 17 and stand elements. An exploded view of the stand assembly 19, 20 is shown, which made up of array nuts and bolts to allow piecemeal construction of the stand for height adjustability. It is desired to include a vertical stand bracket 19, a ground support bracket 20, and a wheel hub support plate 17 in this embodiment of the vehicle immobilizing means. An alternative embodiment of this immobilizing means may incorporate a single-piece construction of the hub support plate 17 and stand assembly.

Overall, the present invention provides a means to secure a trailer in place and thwart thieves using standard and non-standard tools for removing lug nuts or specialty locking nuts. The locking assembly 15 of the present invention is provided to restrict access to the locking nut 13 by surrounding its exterior with two rotatable cylinders. The assembly 15 is useful by itself, as a replacement of a single lug nut for locking a wheel rim, or it is adapted for use with a vehicle immobilizing means as presented in the aforementioned disclosure. The contemplated immobilizing means include a wheel immobilizing security bar 21 and a bare hub support plate 17. The security bar 21 prevents wheel rotation, while the support plate 17 prevents unauthorized wheel mounting to a bare hub.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A security device to prevent unauthorized movement of a wheeled vehicle, said vehicle having removable wheels, each having a hub, a plurality of threaded lug bolts, a predetermined wheel radius, a wheel circumferential perimeter, and a plurality of wheel lug nut connectors, said security device comprising:

at least one locking assembly;

said at least one locking assembly having an outer cylinder, an inner cylinder, a locking lug nut and a lug nut key adapted to engage said locking lug nut;

said locking lug nut comprising an inner threading and an outside surface, wherein said locking lug nut is removably housed within said inner cylinder and said inner cylinder is removably housed within said outer cylinder, and wherein apertures in said outer and inner cylinders align to permit one of said threaded lug bolts to pass through said apertures and engage with said inner threading of said locking lug nut;

said outer and inner cylinders concentrically aligned and adapted to freely rotate about said locking lug nut outside surface;

an elongated security bar having two apertures disposed along a first end to allow penetration of two of said threaded lug bolts, and wherein said at least one locking assembly may engage with at least one of said threaded lug bolts while they extend through said security bar apertures;

a wheel hub support plate;

a vertical mounting bracket;

a ground support bracket;

said wheel hub support plate having a plurality of apertures to allow penetration of said threaded lug bolts and wherein said at least one locking assembly may engage with said threaded lug bolts while they extend through said wheel hub support plate apertures.

2. A device as in claim 1, wherein said vertical mounting bracket further comprises a plurality of apertures to permit adjustment of the length of said vertical mounting bracket.

3. A device as in claim 1, wherein said wheel hub support plate further comprises upstanding cylinders to shroud engagement between said at least one locking assembly and one of said threaded lug bolts.

* * * * *